(12) United States Patent
Lin et al.

(10) Patent No.: US 10,742,542 B2
(45) Date of Patent: Aug. 11, 2020

(54) CONFIGURING TARGETED DISTRIBUTION OF TRAFFIC

(71) Applicant: Juniper Networks, Inc., Sunnyvale, CA (US)

(72) Inventors: Wen Lin, Andover, MA (US); Sharmila Koppula, Campbell, CA (US); Soumyodeep Joarder, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/166,731

(22) Filed: Oct. 22, 2018

(65) Prior Publication Data

US 2020/0127917 A1   Apr. 23, 2020

(51) Int. Cl.
*H04L 12/46*      (2006.01)
*H04L 12/709*     (2013.01)
*H04L 12/721*     (2013.01)
*H04L 12/801*     (2013.01)

(52) U.S. Cl.
CPC ........ *H04L 45/245* (2013.01); *H04L 12/4641* (2013.01); *H04L 45/66* (2013.01); *H04L 47/15* (2013.01)

(58) Field of Classification Search
CPC ... H04L 45/245; H04L 45/66; H04L 12/4641; H04L 47/15
See application file for complete search history.

(56) References Cited

U.S. PATENT DOCUMENTS

2014/0056125 A1* 2/2014 Guellal ................... H04L 45/28
                                                           370/225
2014/0204761 A1* 7/2014 Durrani .................. H04L 47/41
                                                           370/236
2015/0103644 A1* 4/2015 Bharadwaj ............ H04L 41/082
                                                           370/221
2016/0191374 A1* 6/2016 Singh ..................... H04L 41/00
                                                           370/228
2017/0195199 A1* 7/2017 Dorai .................. H04L 43/0811

FOREIGN PATENT DOCUMENTS

| EP | 3041178 A1 | 7/2016 |
| EP | 3188409 A1 | 7/2017 |
| EP | 3264690 A1 | 1/2018 |

OTHER PUBLICATIONS

Extended European Search Report for Application No. EP19165759.2, dated Sep. 27, 2019.

* cited by examiner

*Primary Examiner* — Edan Orgad
*Assistant Examiner* — Malick A Sohrab
(74) *Attorney, Agent, or Firm* — Harrity & Harrity, LLP

(57) ABSTRACT

A device may determine a link aggregation group (LAG) that aggregates links that includes a first group of links that connects the device to a first provider edge (PE) device and a second group of links that connects the device to the second PE device, where the first PE device and the second PE device are on an Ethernet virtual private network (EVPN) and are multi-homed PE devices for the device, and where the first PE device provides a local connection to a customer edge (CE) device for the device. The device may receive a message from the first PE device indicating that the first PE device lacks a connection with the EVPN, and may send, based on the message, traffic intended for the CE device via the first PE device and traffic intended for the EVPN via the second PE device and not the first PE device.

20 Claims, 12 Drawing Sheets

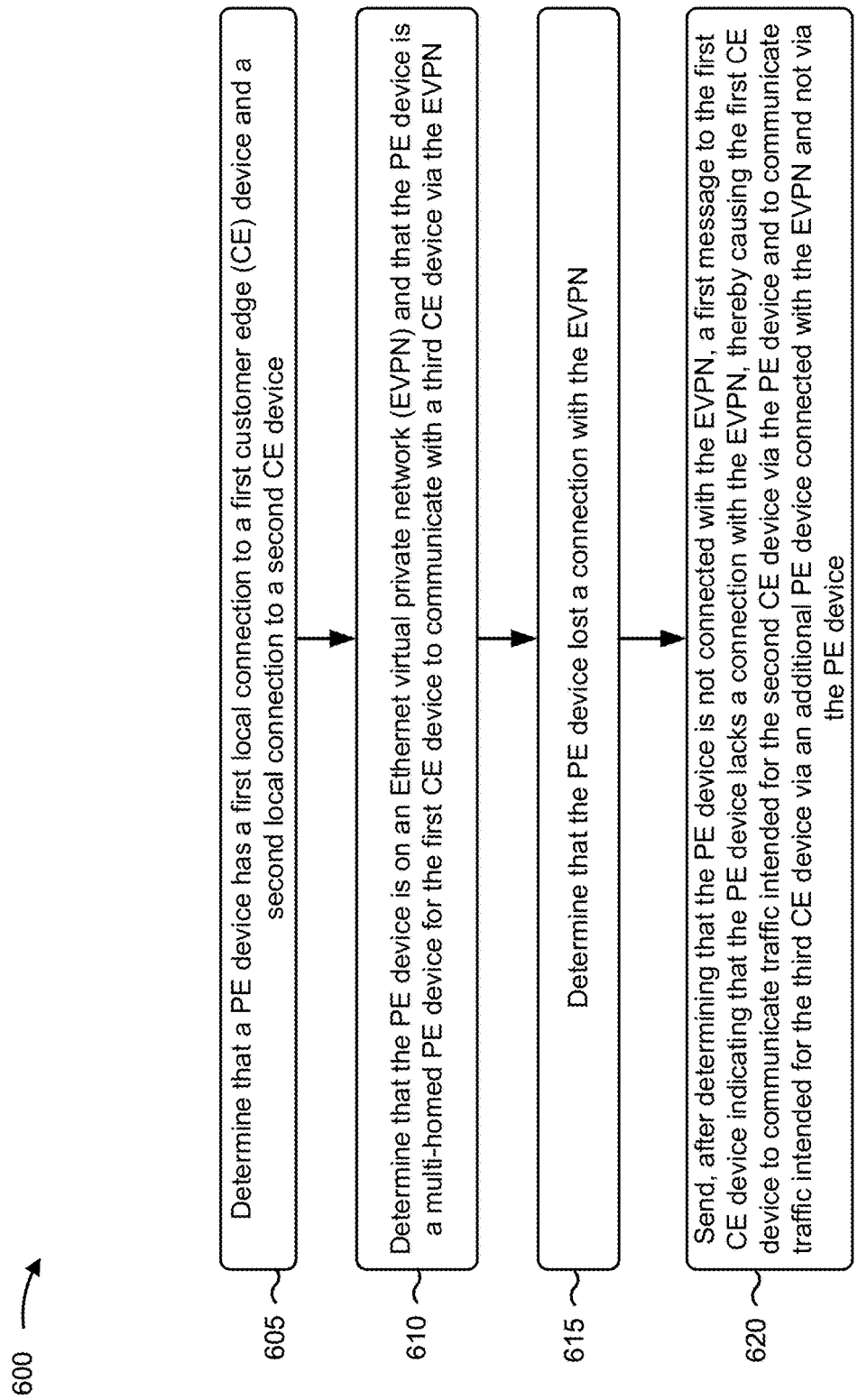

CONFIGURING TARGETED DISTRIBUTION OF TRAFFIC

BACKGROUND

An Ethernet virtual private network (EVPN) enables a group of dispersed customer sites to be connected using a Layer 2 virtual bridge. An EVPN may include customer edge (CE) devices connected to provider edge (PE) devices. In some cases, a CE is multi-homed with two or more PEs on the EVPN.

SUMMARY

According to some possible implementations, a device may include one or more memories, and one or more processors to determine a link aggregation group (LAG) that aggregates a plurality of links that connect the device to a first provider edge (PE) device and a second PE device, wherein the plurality of links includes a first group of links that connects the device to the first PE device and a second group of links that connects the device to the second PE device, wherein the first PE device and the second PE device are on an Ethernet virtual private network (EVPN) and are multi-homed PE devices for the device, and wherein the first PE device provides a local connection to a customer edge (CE) device for the device. The one or more processors may receive, from the first PE device, a message indicating that the first PE device lacks a connection with the EVPN, and may configure, based on the message, the device to send traffic intended for the CE device via the first PE device and traffic intended for the EVPN via the second PE device and not the first PE device. The one or more processors may send, based on configuring the device to send the traffic intended for the CE device via the first PE device and the traffic intended for the EVPN via the second PE device and not the first PE device, first data via the first group of links to the CE device via the first PE device. The one or more processors may send, based on configuring the device to send the traffic intended for the CE device via the first PE device and the traffic intended for the EVPN via the second PE device and not the first PE device, second data via the second group of links to the EVPN via the second PE device.

According to some possible implementations, a non-transitory computer-readable medium may store instructions that include one or more instructions that, when executed by one or more processors of a device, cause the one or more processors to determine a first group of links that connects the device to a first provider edge (PE) device and a second group of links that connects the device to a second PE device, wherein the first PE device provides a local connection to a first customer edge (CE) device for the device, and wherein the first PE device and the second PE device are on an Ethernet virtual private network (EVPN) and act as multi-homed PE devices for the device to communicate with a second CE device via the EVPN. The one or more instructions may cause the one or more processors to receive, from the first PE device, a first message indicating that the first PE device lacks a connection with the EVPN, and to configure, based on the first message, the device to communicate traffic intended for the first CE device via the first PE device and traffic intended for the second CE device via the second PE device and not the first PE device. The one or more instructions may cause the one or more processors to send, based on configuring the device to send the traffic intended for the first CE device via the first PE device and the traffic intended for the second CE device via the second PE device and not the first PE device, first data via the first group of links to the first CE device via the first PE device. The one or more instructions may cause the one or more processors to send, based on configuring the device to send the traffic intended for the first CE device via the first PE device and the traffic intended for the second CE device via the second PE device and not the first PE device, second data via the second group of links to the second CE device via the second PE device. The one or more instructions may cause the one or more processors to receive, from the first PE device and after receiving the first message, a second message indicating that the first PE device is connected with the EVPN, and to configure, based on the second message, the device to communicate the traffic intended for the first CE device via the first PE device and the traffic intended for the second CE device via the first PE device and the second PE device. The one or more instructions may cause the one or more processors to send, based on configuring the device to send traffic intended for the first CE device via the first PE device and traffic intended for the second CE device via the first PE device and the second PE device, third data to the second CE device via the first group of links and the first PE device and via the second group of links and the second PE device.

According to some possible implementations, a method may include determining, by a provider edge (PE) device, that the PE device has a first local connection to a first customer edge (CE) device and a second local connection to a second CE device, and determining, by the PE device, that the PE device is on an Ethernet virtual private network (EVPN) and that the PE device is a multi-homed PE device for the first CE device to communicate with a third CE device via the EVPN. The method may include determining, by the PE device, that the PE device is not connected with the EVPN, and sending, by the PE device and after determining that the PE device is not connected with the EVPN, a first message to the first CE device indicating that the PE device lacks a connection with the EVPN to cause the first CE device to be configured to communicate traffic intended for the second CE device via the PE device and traffic intended for the third CE device via an additional PE device and not the PE device. The method may include determining, by the PE device and after sending the first message, that the PE device is connected with the EVPN, and sending, by the PE device and after determining that the PE device is connected with the EVPN, a second message to the first CE device indicating that the PE device is connected with the EVPN to cause the first CE device to be configured to communicate the traffic intended for the second CE device via the PE device and the traffic intended for the third CE device via the PE device and the additional PE device.

BRIEF DESCRIPTION OF THE DRAWINGS

FIG. 6 is a flow chart of an example process for configuring targeted distribution of traffic.

DETAILED DESCRIPTION

Figure 1A:
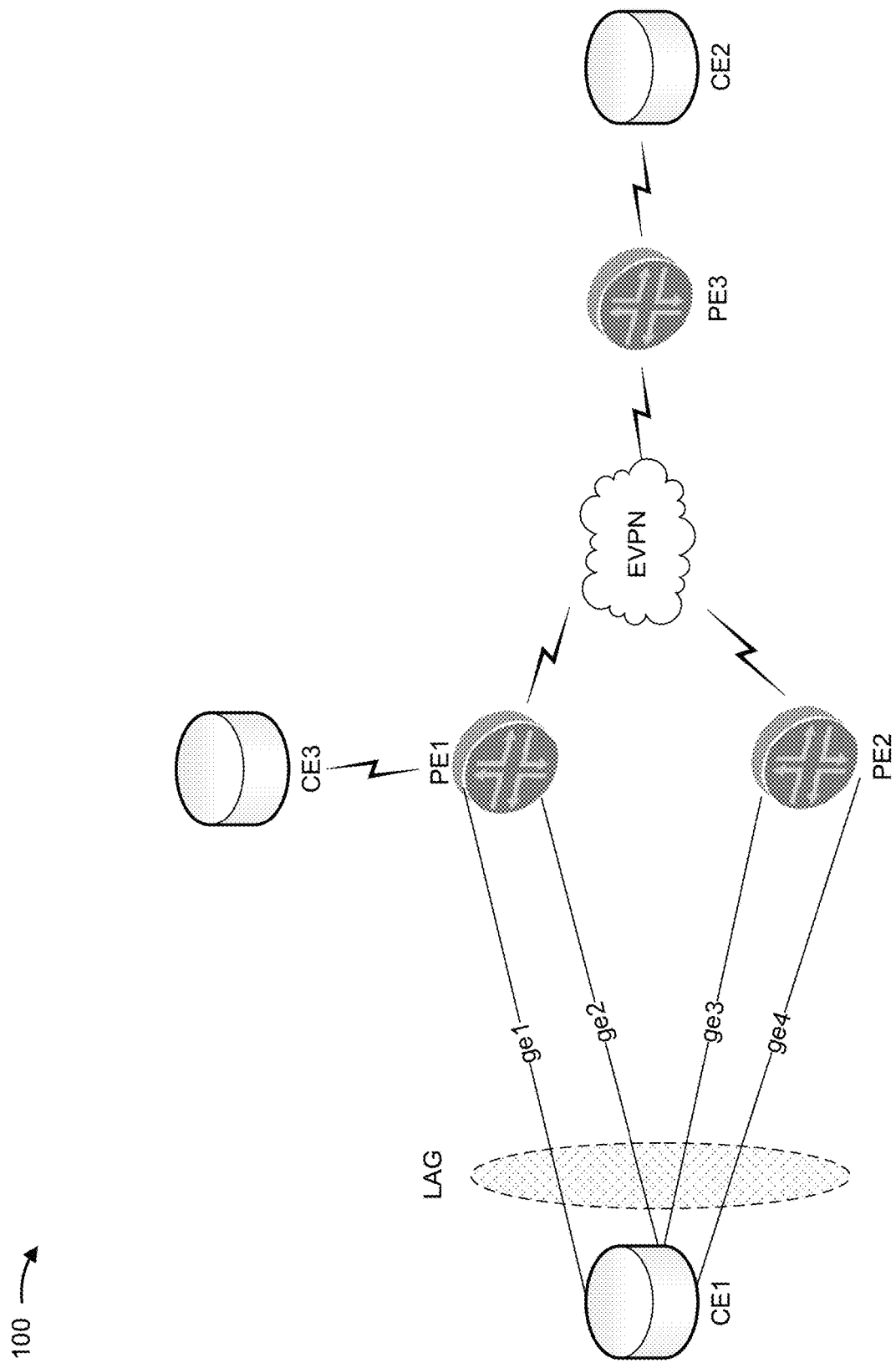
FIG. 1A-1G are diagrams of example implementations described herein.

The following detailed description of example implementations refers to the accompanying drawings. The same reference numbers in different drawings may identify the same or similar elements.

An Ethernet virtual private network (EVPN) enables a group of dispersed customer sites to be connected using a Layer 2 virtual bridge. An EVPN includes customer edge (CE) devices (e.g., devices, such as traffic transfer devices) connected to provider edge (PE) devices (e.g., devices, such as traffic transfer devices). In some EVPN all-active multi-homed scenarios, a source CE is connected to two or more PEs that provide redundancy and EVPN service to the source CE. In some scenarios, the source CE is connected to the two or more PEs by a plurality of links (e.g., a first group of links that connect the CE to a first PE, a second group of links that connect the CE to a second PE, and/or the like). In some scenarios, a particular PE, of the one of the two or more PEs, is locally connected to a destination CE and provides switching of traffic ("local traffic") for the source CE and the destination CE.

Issues arise when the particular PE becomes disconnected from the EVPN (e.g., the particular PE becomes "core isolated," such that the particular PE is no longer able to transmit and/or receive traffic directly with the EVPN). In such a scenario, the group of links that connect the source CE and the particular PE are brought down. This ensures that the source CE sends traffic intended for the EVPN via the links of the plurality of links that connect the source CE to the two or more PEs other than the particular PE, which prevents loss of the traffic intended for the EVPN. However, bringing down the group of links that connect the source CE and the particular PE prevents the source CE from sending traffic intended for the destination CE connected locally to the particular PE. Accordingly, all local traffic intended for the destination CE is therefore blocked or lost.

Some implementations, described herein, provide a first CE that is multihomed with a first PE and a second PE on an EVPN to communicate with a second CE. In some implementations, the first PE provides a local connection to a third CE for the first CE to communicate with the third CE. In some implementations, the first PE may determine that the first PE has become disconnected with the EVPN (e.g., the first PE has become core isolated) and may send a message to the first CE indicating that the first PE has become disconnected with the EVPN. In some implementations, the first CE, based on the message, may be configured to send traffic intended for the third CE via the first PE and traffic intended for the second CE via the second PE and not the first PE. In some implementations, the first CE may then send first traffic via a first group of links to the third CE via the first PE. In some implementations, the first CE may then send second traffic via a second group of links to the second CE via the second PE.

In this way, some implementation described herein allow the first PE, which has become disconnected with the EVPN, to receive the first traffic from the first CE and send the first traffic to the locally connected third CE. In this way, the first CE and the third CE can continue to communicate with each other even when the first PE becomes core isolated. Moreover, some implementations described herein conserve processor and/or memory resources of the devices described herein by reducing the amount of time associated with processing and transmitting duplicate and/or redundant traffic between the first CE and the third CE that would otherwise need to be recommunicated after the first PE becomes reconnected to the EVPN. Further, some implementations allow the devices described herein to handle more traffic being communicated between hundreds, thousands, millions, or more CEs via various PEs, which allows network operators to reduce operating costs by avoiding having to install and maintain additional devices.

FIGS. 1A-1G are diagrams of example implementations 100 described herein. Implementations 100 may include multiple customer edge devices (e.g., shown as customer edge devices CE1 through CE3) and multiple provider edge devices (e.g., shown as provider edge devices PE1 through PE3).

As shown in FIG. 1A, in some implementations, customer edge device CE1 may be connected to provider edge devices PE1 and PE2. In some implementations, the provider edge devices PE1 and PE2 may be on an EVPN. In some implementations, the customer edge device CE1 may be multi-homed with provider edge devices PE1 and PE2 over the EVPN. For example, as shown in FIG. 1A, the customer edge device CE1 may be multi-homed with provider edge devices PE1 and PE2 over the EVPN. In some implementations, the EVPN may be configured in single-active mode (e.g., only a single provider edge device of a plurality of provider edge devices attached to a particular Ethernet segment may forward traffic to and from that Ethernet segment) or all-active mode (e.g., any of the provider edge devices of a plurality of provider edge devices attached to a particular Ethernet segment may forward traffic to and from the Ethernet segment).

In some implementations, the customer edge device CE1 may be connected to the provider edge devices PE1 and PE2 by a plurality of links, such as Gigabit Ethernet (ge) links. For example, as shown in FIG. 1A, the customer edge device CE1 may be connected to the provider edge device PE1 via links ge1 and ge2 and may be connected to the provider edge device PE2 via links ge3 and ge4. In some implementations, the plurality of links includes two or more groups of links. For example, the customer edge device CE1 may be connected to PE1 by a first group of links (e.g., links ge1 and ge2) and may be connected to PE2 by a second group of links (e.g., links ge3 and ge4).

In some implementations, the customer edge device CE1 may aggregate the plurality of links via a link aggregation group (LAG) to share traffic among the plurality of links and enhance connection reliability. For example, as shown in FIG. 1A, customer edge device CE1 may bundle the plurality of links using an aggregation protocol, such as the Link Aggregation Control Protocol (LACP) in active mode (AE).

In some implementations, as shown in FIG. 1A, a provider edge device PE3 may be on the EVPN and may be connected to a customer edge device CE2. In some implementations, the customer edge device CE1 may communicate with the customer edge device CE2 via provider edge devices PE1 and/or PE2, via the EVPN, and via provider edge device PE3.

In some implementations, the provider edge device PE1 may be connected to a customer edge device CE3. In some implementations, the customer edge device CE1 may communicate with the customer edge device CE3 only via the provider edge device PE1. In some implementations, the provider edge device PE1 may provide a local connection to the customer edge device CE3 for the customer edge device CE1 (e.g., the provider edge device PE1 is the only provider edge device that routes traffic between the customer edge devices CE1 and CE3, the provider edge device PE1 does not route traffic between the customer edge devices CE1 and CE3 via the EVPN or another provider edge device, and/or the like).

While some implementations are described herein in the context of traffic being communicated between two customer edge devices, in practice, these implementations apply to traffic being communicated between a plurality (e.g., thousands, millions) of customer edge devices via a plurality of provider edge devices.

Figure 1B:
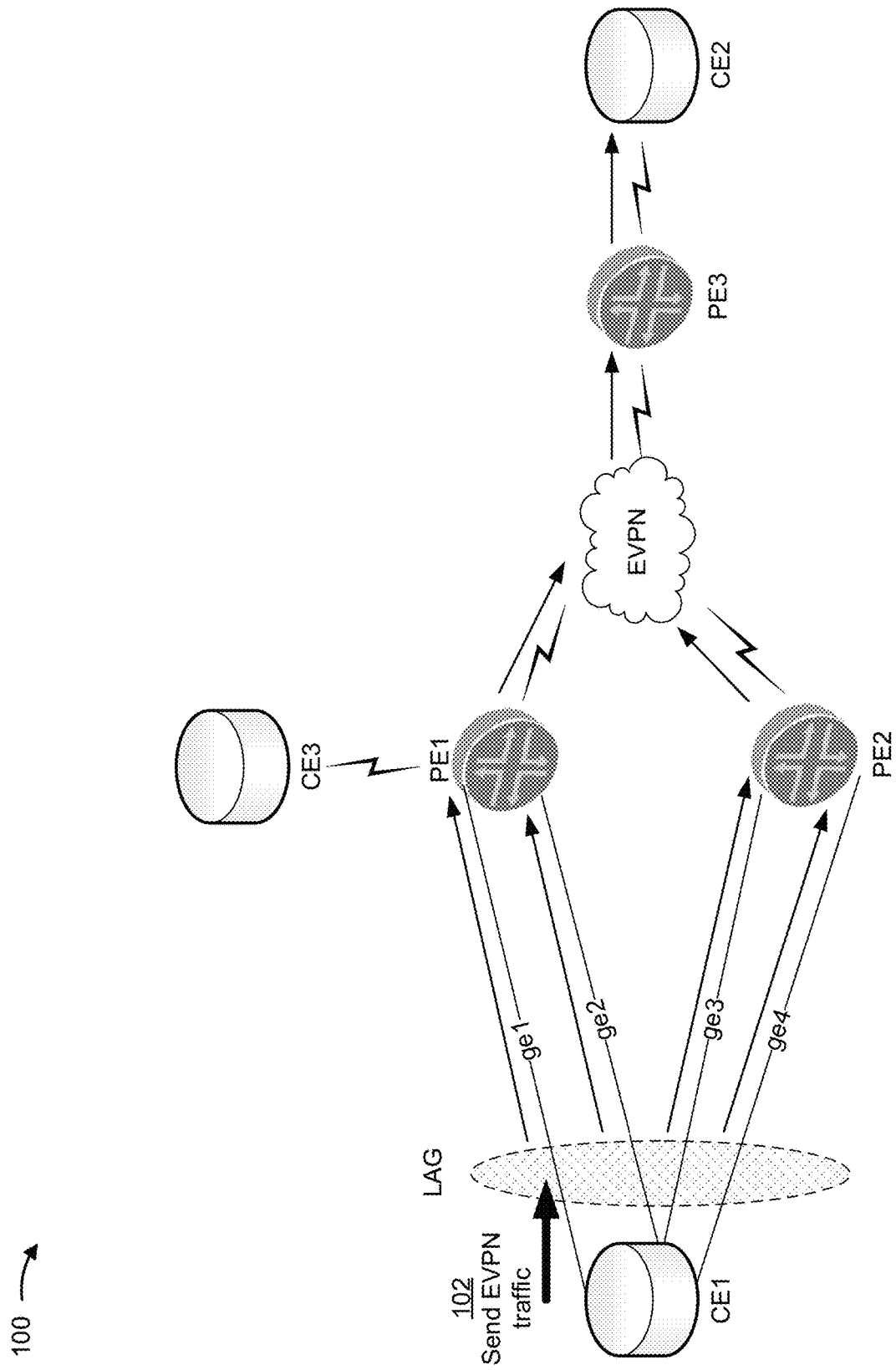

As shown in FIG. 1B, the customer edge device CE1 may communicate with the customer edge device CE2 via the provider edge devices PE1 and/or PE2, via the EVPN, and via the provider edge device PE3. For example, as shown by reference number 102, the customer edge device CE1 may send traffic via the EVPN (e.g., "EVPN traffic") to the customer edge device CE2. In some implementations, the EVPN traffic may include one or more packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As further shown in FIG. 1B, the customer edge device CE1 may send the EVPN traffic to the provider edge devices PE1 and PE2 via the plurality of links (e.g., the links ge1, ge2, ge3, ge4, and/or the like). In some implementations, because the customer edge device CE1 is multi-homed with the provider edge devices PE2 and PE3 and because the customer edge device CE1 may aggregate the plurality of links via the LAG, the customer edge device CE1 may use load balancing to send the EVPN traffic to the provider edge devices PE1 and PE2 (e.g., the customer edge device CE1 may transmit the EVPN traffic to the provider edge devices PE1 and PE2 such that the EVPN traffic is evenly distributed among the provider edge devices PE1 and PE2, such that the EVPN traffic is unevenly distributed among the provider edge devices PE1 and PE2 (e.g., based on different processing capabilities of the provider edge devices PE1 and PE2, based on different loads of the provider edge devices PE1 and PE2), such that the EVPN traffic is evenly distributed among the plurality of links, such that the EVPN traffic is unevenly distributed among the plurality of links (e.g., based on different throughput and/or capacity capabilities of the plurality of links), and/or the like).

As further shown in FIG. 1B, the provider edge devices PE1 and PE2 may send, based on receiving the EVPN traffic from the customer edge device CE1, the EVPN traffic to the provider edge device PE3 via the EVPN. In some implementations, the provider edge device PE3 may send, based on receiving the EVPN traffic from the provider edge devices PE1 and PE2 via the EVPN, the EVPN traffic to the customer edge device CE2. While some implementations are described herein in the context of routing EVPN traffic from the customer edge device CE1 to the customer edge device CE2, in practice, these implementations also apply to routing EVPN traffic from the customer edge device CE2 to the customer edge device CE1 and/or from the customer edge device CE3 to the customer edge device CE1 and/or the customer edge device CE2 in a similar manner.

Figure 1C:
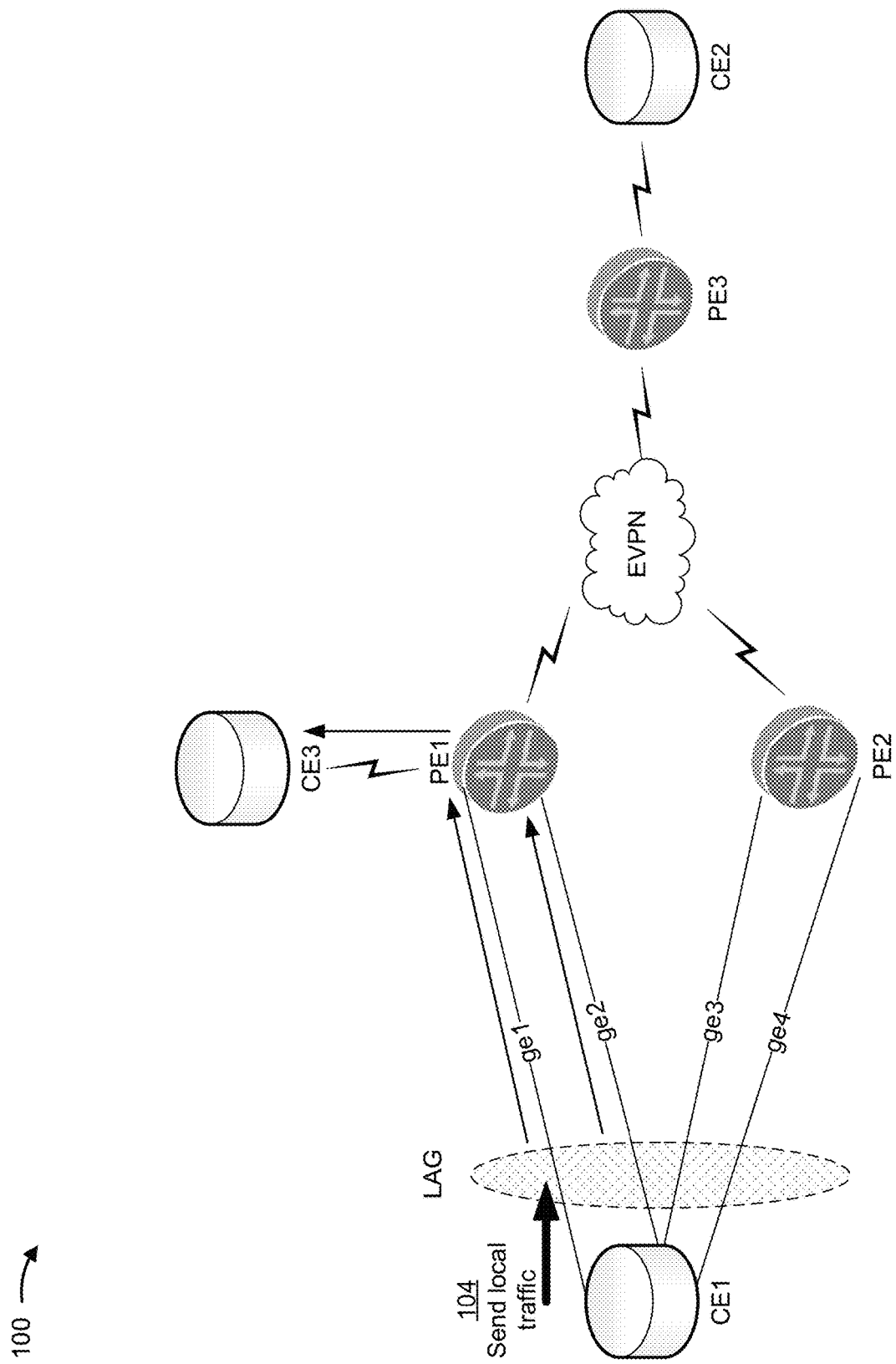

As shown by FIG. 1C, the customer edge device CE1 may communicate with the customer edge device CE3 via the provider edge device PE1. As shown by reference number 104, the customer edge device CE1 may send local traffic (e.g., traffic sent from the customer edge device CE1 to the customer edge device CE3 via the provider edge device PE1 locally connected to the customer edge device CE3 (and not via the EVPN)) intended for customer edge device CE3 via the provider edge device PE1, which is locally connected to the customer edge device CE3, and not via the EVPN. In some implementations, the local traffic may include one or more packets.

As further shown in FIG. 1C, the customer edge device CE1 may send the local traffic to the provider edge device PE1 via the first group of links (e.g., links ge1 and ge2). As further shown in FIG. 1C, the provider edge device PE1 may send, based on receiving the local traffic from the customer edge device CE1, the local traffic to the customer edge device CE3. While some implementations are described herein in the context of routing local traffic from the customer edge device CE1 to the customer edge device CE3, in practice, these implementations also apply to routing local traffic from the customer edge device CE3 to the customer edge device CE1 in a similar manner.

Figure 1D:
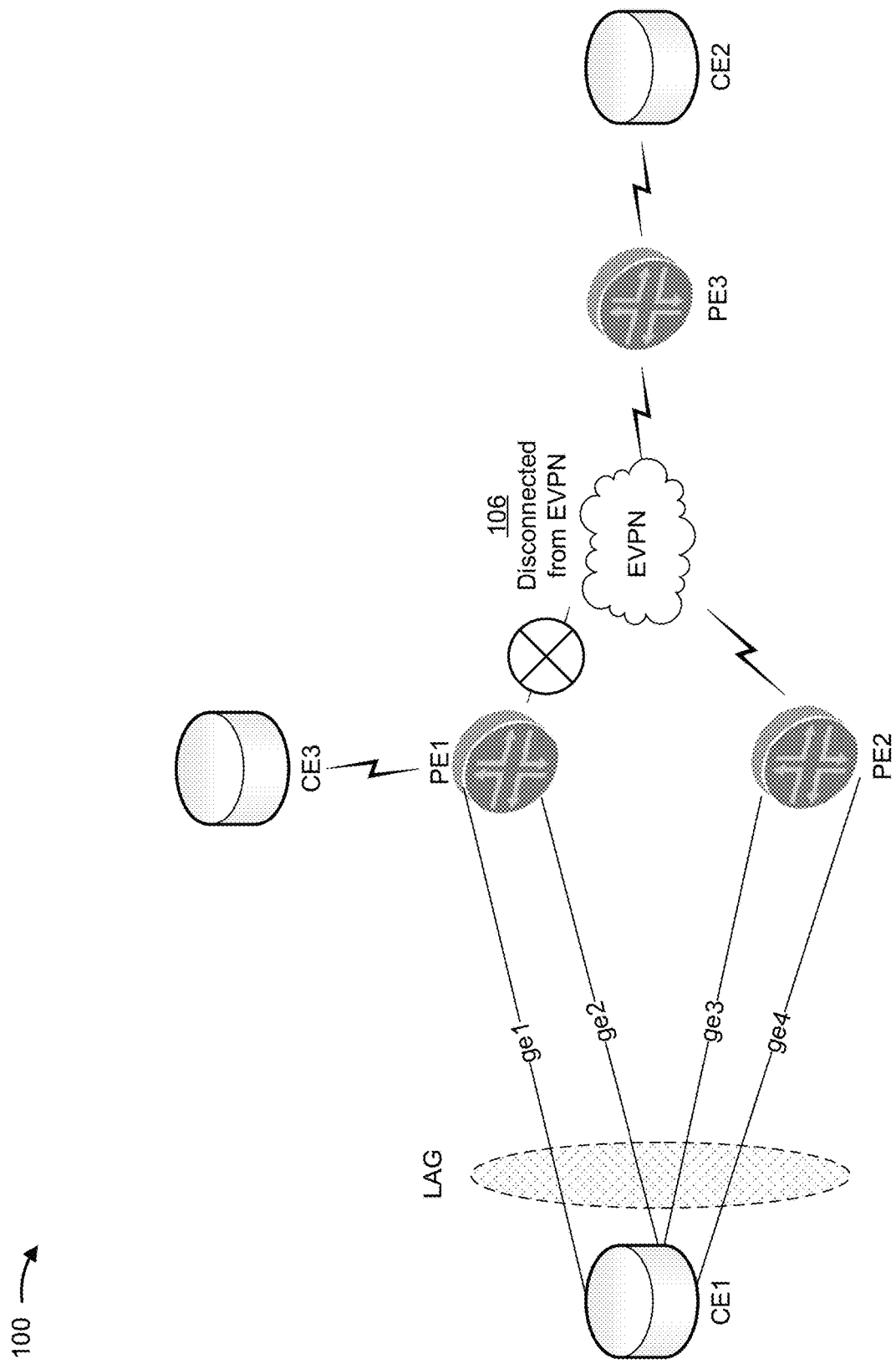

As shown in FIG. 1D and by reference number 106, the provider edge device PE1 may become disconnected with the EVPN (e.g., a "core isolation" occurs, the provider edge device PE1 becomes an "isolated core" with respect to the EVPN, and/or the like). For example, the provider edge device PE1 may lose a connection, such as a Border Gateway Protocol (BGP) connection, with the EVPN. In some implementations, the provider edge device PE1 may not be able to send and/or receive traffic via the EVPN when the provider edge device PE1 becomes disconnected with the EVPN. In some implementations, the provider edge device PE1 may determine that the provider edge device PE1 has become disconnected with the EVPN and/or the like. For example, the provider edge device PE1 may refresh a list of EVPN peers (e.g., provider edge devices that can communicate with the provider edge device PE1 via the EVPN), but the list may no longer be populated (e.g., the list becomes null), which indicates that the provider edge device PE1 has lost connection with the EVPN. As another example, the provider edge device PE1 may not receive traffic via the EVPN for a threshold period of time to determine that the provider edge device PE1 has become disconnected with the EVPN.

Figure 1E:
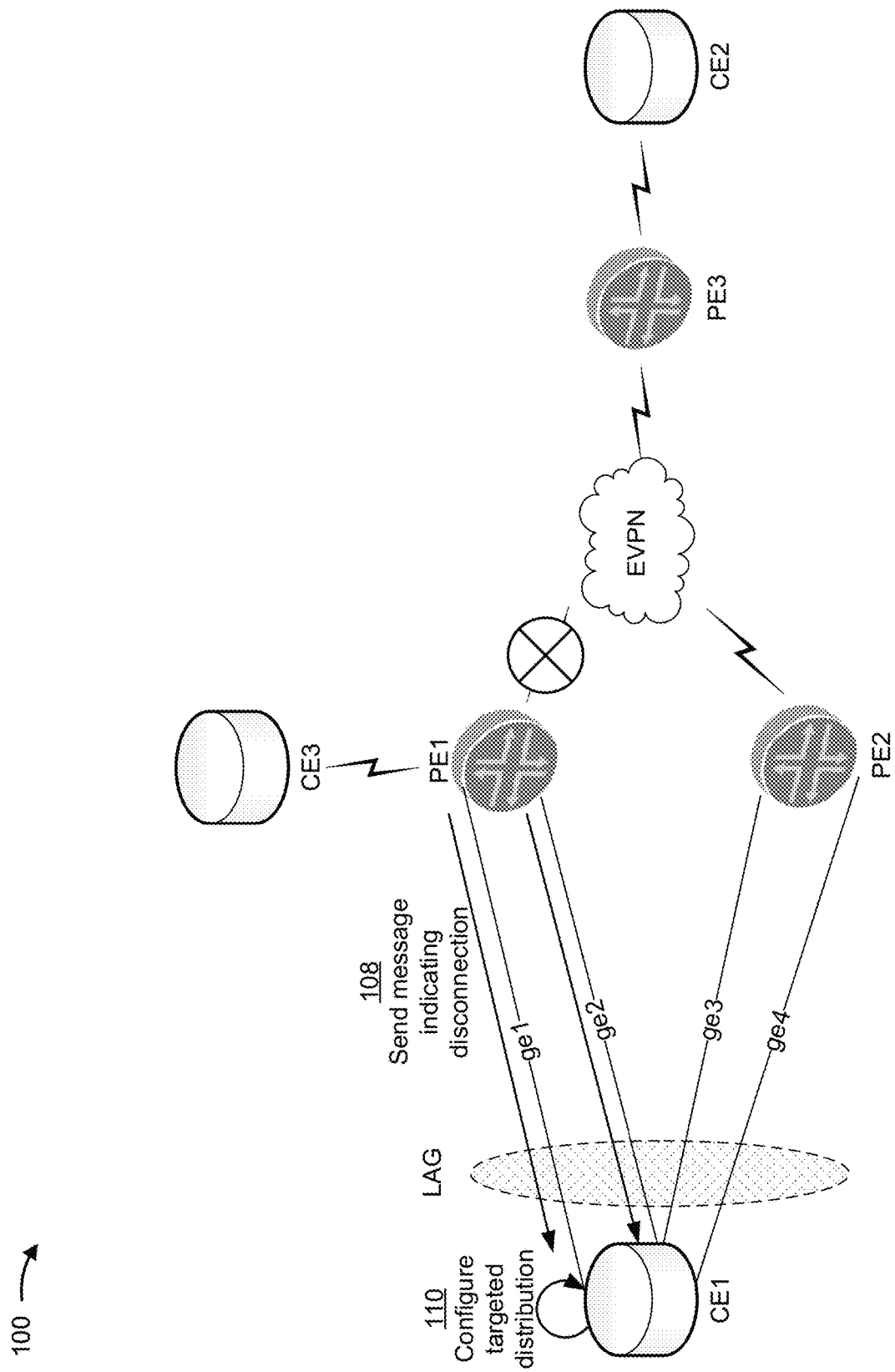

As shown in FIG. 1E and by reference number 108, the provider edge device PE1 may send a first message to the customer edge device CE1 upon determining that the provider edge device PE1 has become disconnected with the EVPN. In some implementations, the first message may indicate that the provider edge device PE1 is not connected with the EVPN. For example, the provider edge device PE1 may send a first message indicating that the provider edge device PE1 lacks a connection with the EVPN.

In some implementations, the customer edge device CE1 may obtain (e.g., receive, request and receive, and/or the like) the first message from the provider edge device PE1. In some implementations, the provider edge device PE1 may send the first message via one or more links of the first group of links (e.g., links ge1 and ge2) and the customer edge device CE1 may receive the first message via the one or more links of the first group of links. In some implementations, the provider edge device PE may select multiple links of the first group of links to send the first message to increase reliability of receipt of the first message by the customer edge device CE1. In some implementations, the provider edge device PE1 may select a particular link of the first group of links (e.g., link ge1) and send the first message via the particular link. In some implementations, the particular link of the first group of links may be a most reliable link of the first group of links, a least loaded link of the first group of links, a default link that the customer edge device CE1 is configured to monitor for messages from the provider edge device PE1, and/or the like. In this way, the provider edge device PE1 may select the particular link and send the first message via the particular link such that processing resources of customer edge device CE1 are conserved that would otherwise be wasted monitoring multiple links for an incoming message from the provider edge device PE1. In some implementations, the customer edge device CE1 may receive the first message via the particular link. In some implementations, the first message may be one or more packets, such as a LACP PDU and/or the like.

As shown by reference number 110, the customer edge device CE1 may be configured (e.g., by the customer edge device CE1, by another customer edge device, by a provider edge device, by a network management device, by a network operator, and/or the like), based on the first message, to send traffic using targeted distribution (e.g., use different links to send the local traffic, the EVPN traffic, and/or the like). In some implementations, the customer edge device CE1 may be configured, based on the first message, to send traffic intended for the customer edge device CE3 via the provider edge device PE1. In some implementations, the customer edge device CE1 may be configured, based on the first message, to send traffic intended for the EVPN, for the provider edge device PE3, for the customer edge device CE2, and/or the like via the provider edge device PE2 and not via the provider edge device PE1.

In some implementations, the customer edge device CE1 may generate a targeted distribution list to configure the customer edge device CE1 to send the traffic intended for the customer edge device CE3 via the provider edge device PE1 and/or to send the traffic intended for the EVPN, for the provider edge device PE3, for the customer edge device CE2, and/or the like via the provider edge device PE2 and not via the provider edge device PE1. In some implementations, the targeted distribution list may indicate that the customer edge device CE1 is to communicate the traffic intended for the customer edge device CE3 via the first group of links (and not via the second group of links) and that the customer edge device CE3 is to communicate the traffic intended for the EVPN, for the provider edge device PE3, for the customer edge device CE2, and/or the like via the second group of links (and not via the first group of links).

Figure 1F:
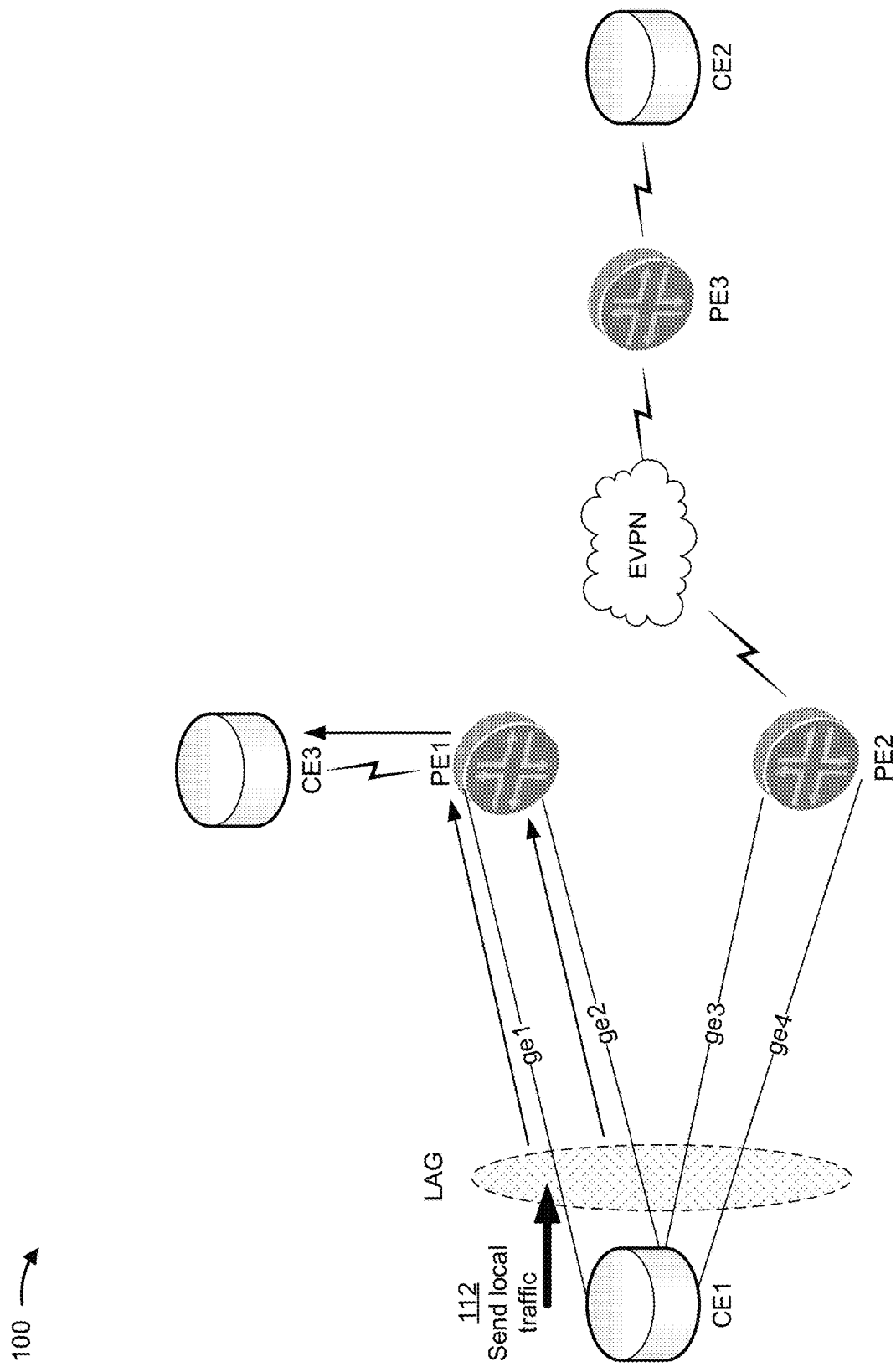

As shown in FIG. 1F and by reference number 112, the customer edge device CE1 may send the local traffic (e.g., traffic sent from the customer edge device CE1 to the customer edge device CE3 via the provider edge device PE1 locally connected to the customer edge device CE3 (and not via the EVPN)) to the customer edge device CE3. In some implementations, the customer edge device CE1 may send the local traffic to the customer edge device CE3 based on configuring the customer edge device CE1 to send traffic intended for the customer edge device CE3 via the provider edge device PE1 and/or to send traffic intended for the EVPN, for the provider edge device PE3, for the customer edge device CE2, and/or the like via the provider edge device PE2 and not the provider edge device PE1. In some implementations, the customer edge device CE1 may send first traffic (e.g., via the first group of links, a particular link and/or particular links of the first group of links, and/or the like) to the customer edge device CE3 via the provider edge device PE1 based on configuring the customer edge device CE1 to send traffic intended for the customer edge device CE3 via the provider edge device PE1.

In some implementations, the customer edge device CE1 may determine that the first traffic is to be transmitted to the customer edge device CE3. In some implementations, the customer edge device CE1 may determine, based on determining that the first traffic is to be transmitted to the customer edge device CE3 and based on the targeted distribution list, that the customer edge device CE1 is to send the first traffic via the first group of links (and not via the second group of links) to the provider edge device PE1. In some implementations, the customer edge device CE1 may send, based on determining that the customer edge device CE1 is to send the first traffic via the first group of links (and not via the second group of links) to the provider edge device PE1, the first traffic to the provider edge device PE1 via the first group of links.

In some implementations, the provider edge device PE1 may receive the first traffic from the customer edge device CE1. In some implementations, the provider edge device PE1 may receive the first traffic via the first group of links, and/or the particular link and/or the particular links of the first group of links. In some implementations, the provider edge device PE1 may send the first traffic to the customer edge device CE3.

Figure 1G:
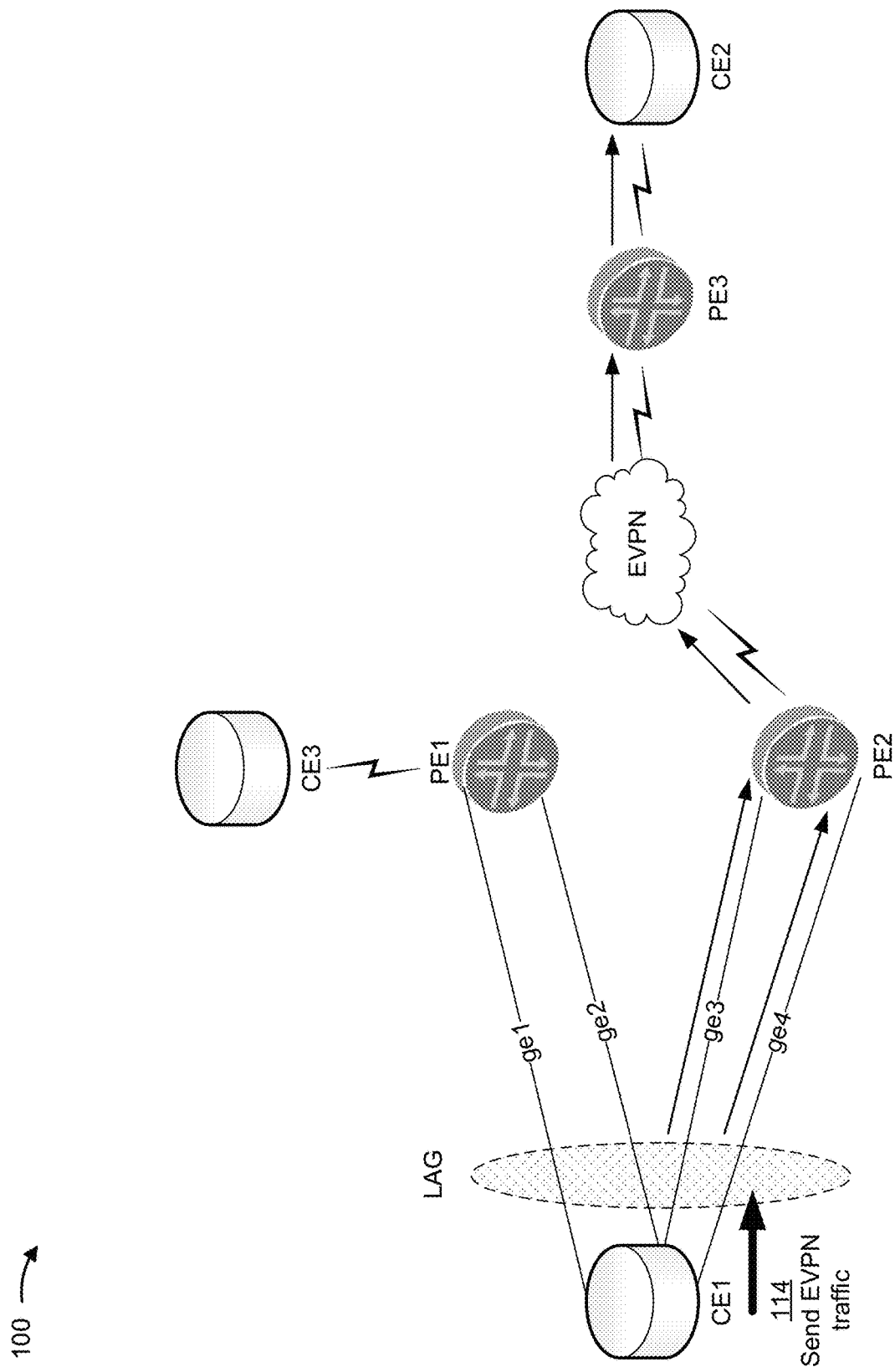

As shown in FIG. 1G and by reference number 114, the customer edge device CE1 may send EVPN traffic to the customer edge device CE2. In some implementations, the customer edge device CE1 may send the EVPN traffic based on configuring the customer edge device CE1 to send traffic intended for the customer edge device CE3 via the provider edge device PE1 and/or to send traffic intended for the EVPN, for the provider edge device PE3, for the customer edge device CE2, and/or the like via the provider edge device PE2 and not the provider edge device PE1. For example, the customer edge device CE1 may send second traffic via the second group of links to the EVPN, the provider edge device PE3, the customer edge device CE2, and/or the like via the provider edge device PE2 based on configuring the customer edge device CE1 to send traffic intended for the EVPN, for the provider edge device PE3, for the customer edge device CE2, and/or the like via the provider edge device PE2 and not via the provider edge device PE1.

In some implementations, the customer edge device CE1 may determine that the second traffic is to be transmitted to the EVPN, the provider edge device PE3, the customer edge device CE2, and/or the like. In some implementations, the customer edge device CE1 may determine, based on determining that the second traffic is to be transmitted to the EVPN, the provider edge device PE3, the customer edge device CE2, and/or the like and based on the targeted distribution list, that the customer edge device CE1 is to send the second traffic via the second group of links (and not via the first group of links) to the provider edge device PE2. In some implementations, the customer edge device CE1 may send, based on determining that the customer edge device CE1 is to send the second traffic via the second group of links (and not via the first group of links) to the provider edge device PE2, the second traffic to the provider edge device PE2 via the second group of links.

Additional implementations exist as well. For example, in some implementations, the provider edge device PE1 may become reconnected with the EVPN. For example, the provider edge device PE1 may establish a new connection, such as a BGP connection, with the EVPN. In some implementations, the provider edge device PE1 may determine that the provider edge device PE1 has become reconnected with the EVPN. For example, the provider edge device PE1 may determine, after sending the first message (e.g., after notifying the customer edge device CE1 that the provider edge device PE1 lacked a connection with the EVPN), that the provider edge device PE1 is connected with the EVPN. As another example, the provider edge device PE1 may refresh the list of EVPN peers (e.g., provider edge devices that can communicate with the provider edge device PE1 via the EVPN), which was previously empty, to determine that the list is populated, which indicates that the provider edge device PE1 has become reconnected with the EVPN. As a further example, the provider edge device PE1, after a period of not receiving traffic via the EVPN, may begin to receive traffic via the EVPN to determine that the provider edge device PE1 is connected with the EVPN again.

In some implementations, the provider edge device PE1 may send a second message to the customer edge device CE1 in a similar manner as described herein in relation to FIG. 1E. In some implementations, the second message may indicate that the provider edge device PE1 is connected with the EVPN. For example, the provider edge device PE1 may send, after sending the first message, a second message indicating that the provider edge device PE1 is connected with the EVPN.

In some implementations, the customer edge device CE1 may obtain (e.g., receive, request and receive, and/or the like) the second message from the provider edge device PE1 in a similar manner as described herein in relation to FIG. 1E. In some implementations, the provider edge device PE1 may send the second message via the one or more links of the first group of links (e.g., the links ge1 and ge2) and the customer edge device CE1 may receive the second message via the one or more links of the first group of links. In some implementations, the provider edge device PE may select multiple links of the first group of links to send the first message to increase reliability of receipt of the first message by the customer edge device CE1. In some implementations, the provider edge device PE1 may select a particular link of the first group of links (e.g., link ge2) and send the second message via the particular link. In some implementations, the particular link of the first group of links may be a most reliable link of the first group of links, a least loaded link of the first group of links, a default link that the customer edge device CE1 is configured to monitor for messages from the provider edge device PE1, and/or the like. In this way, the provider edge device PE1 may select the particular link and send the second message via the particular link such that processing resources of customer edge device CE1 are conserved that would otherwise be wasted monitoring multiple links for an incoming message from the provider edge device PE1. In some implementations, the particular link may be the same link that the provider edge device PE1 used to send the first message (e.g., because the customer edge device CE1 is configured to monitor the particular link for messages from the provider edge device PE1). In some implementations, the particular link may be different than the link that the provider edge device PE1 used to send the first message (e.g., because the link that the provider edge device PE1 used to send the first message is no longer reliable, has become too busy, and/or the like). In some implementations, the customer edge device CE1 may receive the second message via the particular link. In some implementations, the second message may be one or more packets, such as a LACP PDU, and/or the like.

In some implementations, the customer edge device CE1 may be configured based on the second message in a similar manner as described herein in relation to FIG. 1E. In some implementations, the customer edge device CE1 may be configured, based on the second message, to send traffic intended for the customer edge device CE3 via the provider edge device PE1. In some implementations, the customer edge device CE1 may be configured, based on the second message, to send traffic intended for the EVPN, for the provider edge device PE3, for the customer edge device CE2, and/or the like via the provider edge devices PE1 and PE2.

In some implementations, based on the second message, the customer edge device CE1 may update the targeted distribution list to configure the customer edge device CE1 to send traffic intended for the customer edge device CE3 via the provider edge device PE1 and/or the customer edge device CE1 to send traffic intended for the EVPN, for the provider edge device PE3, for the customer edge device CE2, and/or the like via the provider edge devices PE1 and PE2. In some implementations, the customer edge device CE1 may update the targeted distribution list to indicate that the customer edge device CE1 is to communicate the traffic intended for the customer edge device CE3 via the first group of links and that the device is to communicate the traffic intended for the EVPN, for the provider edge device PE3, for the customer edge device CE2, and/or the like via the first group of links and the second group of links.

In some implementations, the customer edge device CE1 may send local traffic to the customer edge device CE3 in a similar manner as described herein in relation to FIGS. 1C and 1F. In some implementations, the customer edge device CE1 may send the local traffic based on configuring the customer edge device CE1 to send traffic intended for the customer edge device CE3 via the provider edge device PE1 and/or to send traffic intended for the EVPN, for the provider edge device PE3, for the customer edge device CE2, and/or the like via the provider edge devices PE1 and PE2. For example, the customer edge device CE1 may send third traffic via the first group of links to the customer edge device CE3 via the provider edge device PE1 based on configuring the customer edge device CE1 to send traffic intended for the customer edge device CE3 via the provider edge device PE1.

In some implementations, the provider edge device PE1 may receive the third traffic from the customer edge device CE1. In some implementations, the provider edge device may receive the third traffic via the first group of links, a particular link of the first group of links, and/or particular links of the first group of links. In some implementations, the provider edge device PE1 may send the third traffic to the customer edge device CE3.

In some implementations, the customer edge device CE1 may send the EVPN traffic to the customer edge device CE2 in a similar manner as described herein in relation to FIG. 1B. In some implementations, the customer edge device CE1 may send the EVPN traffic based on configuring the customer edge device CE1 to send traffic intended for the customer edge device CE3 via the provider edge device PE1 and/or to send traffic intended for the EVPN, for the provider edge device PE3, for the customer edge device CE2, and/or the like via the provider edge devices PE1 and PE2. For example, the customer edge device CE1 may send fourth traffic to the provider edge device PE1 via the first group of links and to the provider edge device PE2 via the second group of links to route the traffic to the EVPN, the provider edge device PE3, the customer edge device CE2, and/or the like based on configuring the customer edge device CE1 to send traffic intended for the EVPN, for the provider edge device PE3, for the customer edge device CE2, and/or the like via the provider edge devices PE1 and PE2.

In some implementations, the provider edge device PE1, after sending the second message, may receive fifth traffic intended for the customer edge device CE1 from the customer edge device CE2 via the EVPN. In some implementations, the provider edge device PE1 may send the fifth traffic to the customer edge device CE1 via the first group of links. In some implementations, the customer edge device CE1 may receive, based on configuring the customer edge device CE1 to send traffic intended for the EVPN, for the provider edge device PE3, for the customer edge device CE2, and/or the like via the provider edge devices PE1 and PE2, the fifth traffic from the customer edge device CE2 via the provider edge device PE1 via the first group of links and via the provider edge device PE2 via the second group of links.

In some implementations, the provider edge device PE1, after sending the second message, may receive sixth traffic intended for the customer edge device CE3 from the customer edge device CE2 via the EVPN. In some implementations, the provider edge device PE1 may send the sixth traffic to the customer edge device CE3.

As indicated above, FIGS. 1A-1G are provided merely as examples. Other examples may differ from what was described with regard to FIGS. 1A-1G.

Figure 2:
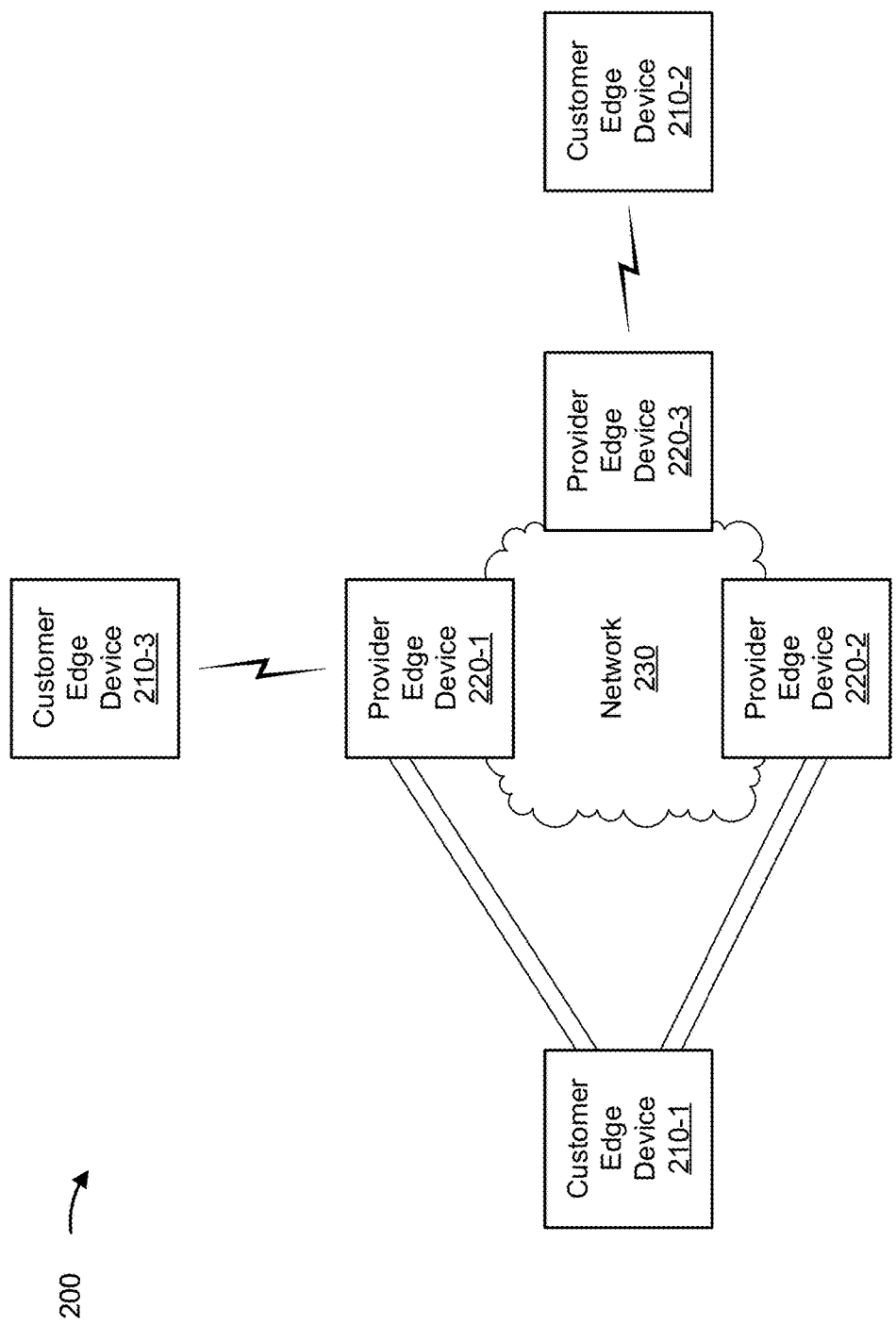
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include customer edge device 210-1, customer edge device 210-2, and customer edge device 210-3 (hereinafter referred to collectively as "customer edge devices 210," and individually as "customer edge device 210"); provider edge device 220-1, provider edge device 220-2, and provider edge device 220-3 (hereinafter referred to collectively as "provider edge devices 220," and individually as "provider edge device 220"); and a network 230. Devices of environment 200 may interconnect via wired connections, wireless connections, or a combination of wired and wireless connections.

Customer edge device 210 includes one or more devices (e.g., one or more traffic transfer devices) capable of processing and/or transferring traffic. For example, customer edge device 210 may include a firewall, a router, a gateway, a switch, a hub, a bridge, a reverse proxy, a server (e.g., a proxy server), a security device, an intrusion detection device, a load balancer, or a similar type of device. In some implementations, customer edge device may be connected to provider edge device 220 via a link, a plurality of links, one or more groups of links, and/or the like, as described elsewhere herein. In some implementations, customer edge device 210 may transmit traffic to provider edge device 220 and receive traffic from provider edge device 220, as described elsewhere herein. In some implementations, customer edge device 210 may be a physical device implemented within a housing, such as a chassis. In some implementations, customer edge device 210 may be a virtual device implemented by one or more computer devices of a cloud computing environment or a data center.

Provider edge device 220 includes one or more devices (e.g., one or more traffic transfer devices) capable of processing and/or transferring traffic. For example, provider edge device 220 may include a firewall, a router, a gateway, a switch, a hub, a bridge, a reverse proxy, a server (e.g., a proxy server), a security device, an intrusion detection device, a load balancer, or a similar type of device. In some implementations, provider edge device 220 may receive traffic from customer edge device 210 and may transmit the traffic to another customer edge device 210 and/or another provider edge device 220, as described elsewhere herein. In some implementations, provider edge device 220 may be a physical device implemented within a housing, such as a chassis. In some implementations, provider edge device 220 may be a virtual device implemented by one or more computer devices of a cloud computing environment or a data center.

Network 230 includes one or more wired and/or wireless networks. For example, network 230 may include a cellular network (e.g., a long-term evolution (LTE) network, a 3G network, a 4G network, a 5G network, a new radio (NR) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), an Ethernet network, an Ethernet virtual private network (EVPN), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
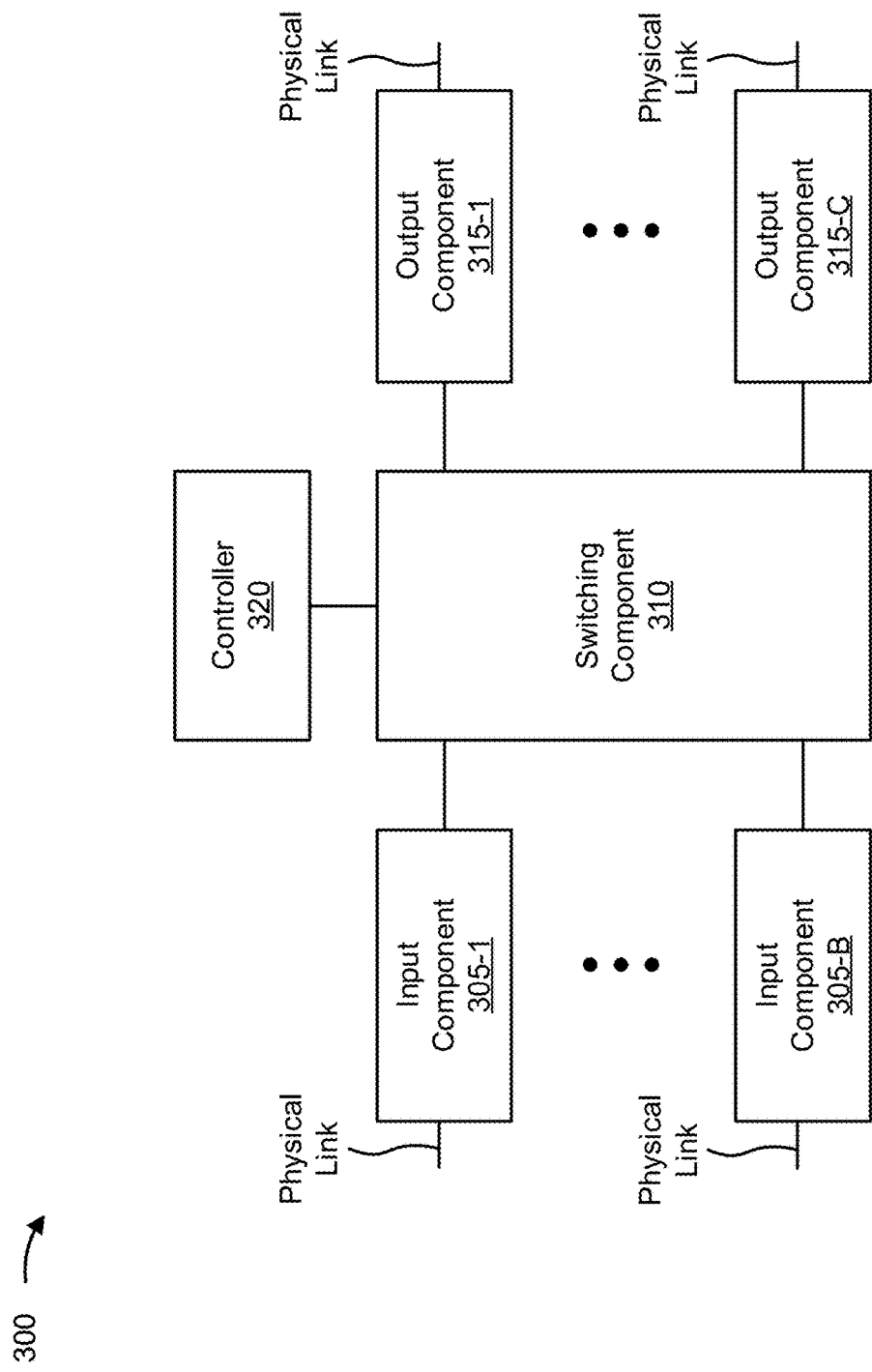
FIG. 3 is a diagram of example components of one or more devices of FIG. 2.

FIG. 3 is a diagram of example components of a device 300. Device 300 may correspond to customer edge device 210 and/or provider edge device 220. In some implementations, customer edge device 210 and/or provider edge device 220 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
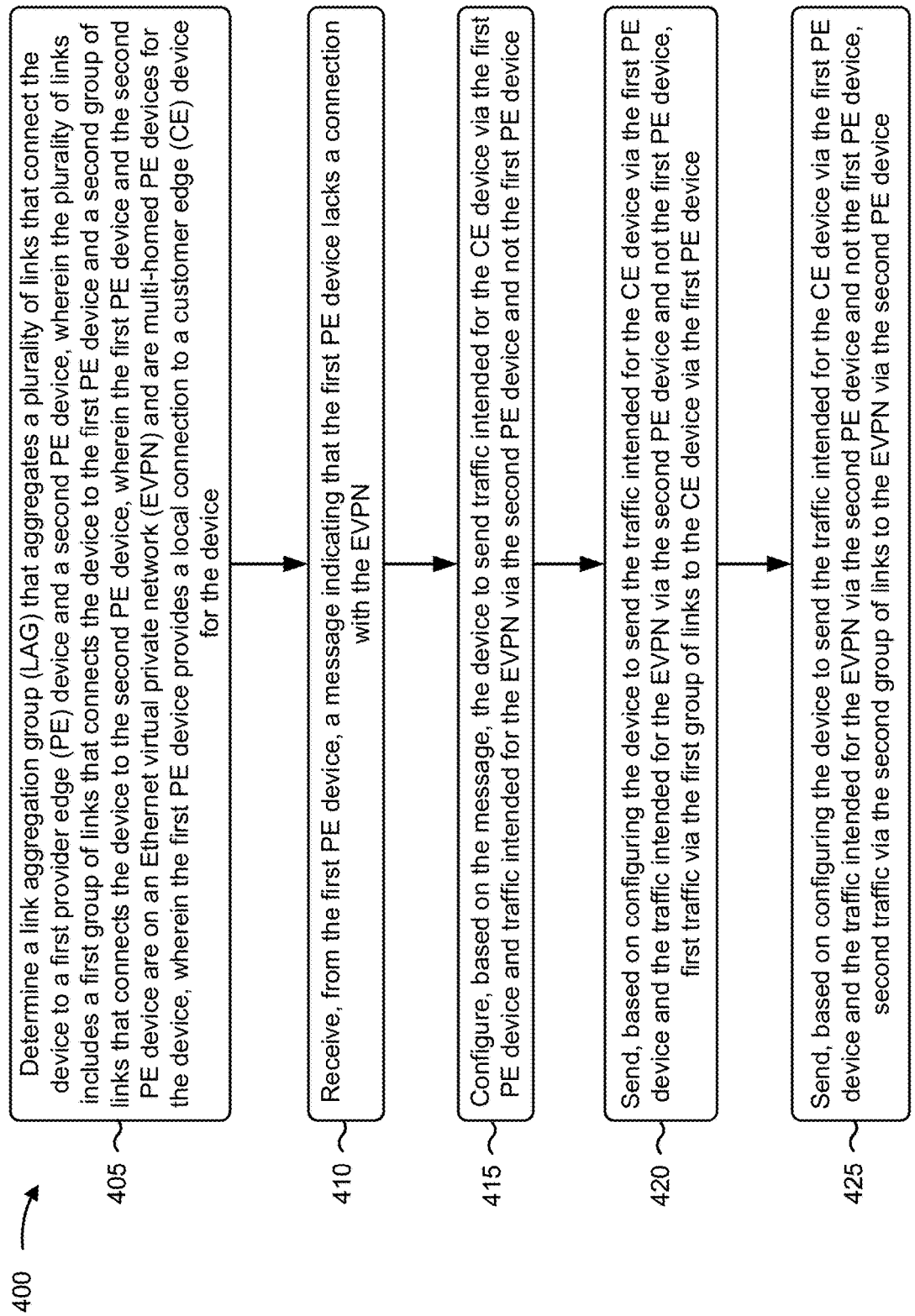
FIG. 4 is a flow chart of an example process for configuring targeted distribution of traffic.

FIG. 4 is a flow chart of an example process 400 for configuring targeted distribution of traffic. In some implementations, one or more process blocks of FIG. 4 may be performed by a customer edge device (e.g., customer edge device 210-1). In some implementations, one or more process blocks of FIG. 4 may be performed by another device or a group of devices separate from or including the customer edge device, such as another customer edge device (e.g., customer edge device 210-2 and/or customer edge device 210-3) and/or a provider edge device (e.g., provider edge device 220).

As shown in FIG. 4, process 400 may include determining a link aggregation group (LAG) that aggregates a plurality of links that connect the customer edge device to a first provider edge (PE) device and a second PE device, wherein the plurality of links includes a first group of links that connects the customer edge device to the first PE device and a second group of links that connects the customer edge device to the second PE device, wherein the first PE device and the second PE device are on an Ethernet virtual private network (EVPN) and are multi-homed PE devices for the customer edge device, and wherein the first PE device provides a local connection to a destination customer edge (CE) device for the customer edge device (block 405). For example, the customer edge device (e.g., using input component 305, switching component 310, output component 315, controller 320, and/or the like) may determine a LAG that aggregates a plurality of links that connect the customer edge device to a first PE device and a second PE device, as described above in connection with FIGS. 1A-1G. In some implementations, the plurality of links may include a first group of links that connects the customer edge device to the first PE device and a second group of links that connects the customer edge device to the second PE device. In some implementations, the first PE device and the second PE device may be on an Ethernet virtual private network (EVPN) and may be multi-homed PE devices for the device. In some implementations, the first PE device may provide a local connection to a destination customer edge (CE) device for the customer edge device.

As further shown in FIG. 4, process 400 may include receiving, from the first PE device, a message indicating that the first PE device lacks a connection with the EVPN (block 410). For example, the customer edge device (e.g., using input component 305, switching component 310, controller 320, and/or the like) may receive, from the first PE device, a message indicating that the first PE device lacks a connection with the EVPN, as described above in connection with FIGS. 1A-1G.

As further shown in FIG. 4, process 400 may include configuring, based on the message, the customer edge device to send traffic intended for the destination CE device via the first PE device and traffic intended for the EVPN via the second PE device and not the first PE device (block 415). For example, the customer edge device (e.g., using switching component 310, output component 315, controller 320, and/or the like) may configure, based on the message, the customer edge device to send traffic intended for the destination CE device via the first PE device and traffic intended for the EVPN via the second PE device and not the first PE device, as described above in connection with FIGS. 1A-1G.

As further shown in FIG. 4, process 400 may include sending, based on configuring the customer edge device to send the traffic intended for the CE device via the first PE device and the traffic intended for the EVPN via the second PE device and not the first PE device, first traffic via the first group of links to the destination CE device via the first PE device (block 420). For example, the customer edge device (e.g., using switching component 310, output component 315, controller 320, and/or the like) may send, based on configuring the device to send the traffic intended for the CE device via the first PE device and the traffic intended for the EVPN via the second PE device and not the first PE device, first traffic via the first group of links to the destination CE device via the first PE device, as described above in connection with FIGS. 1A-1G.

As further shown in FIG. 4, process 400 may include sending, based on configuring the customer edge device to send the traffic intended for the destination CE device via the first PE device and the traffic intended for the EVPN via the second PE device and not the first PE device, second traffic via the second group of links to the EVPN via the second PE device (block 425). For example, the customer edge device (e.g., using switching component 310, output component 315, controller 320, and/or the like) may send, based on configuring the device to send the traffic intended for the destination CE device via the first PE device and the traffic intended for the EVPN via the second PE device and not the first PE device, second traffic via the second group of links to the EVPN via the second PE device, as described above in connection with FIGS. 1A-1G.

Process 400 may include additional implementations, such as any single implementation or any combination of implementations described below and/or in connection with one or more other processes described elsewhere herein.

In some implementations, the EVPN may be configured in all-active mode. In some implementations, the message may be a link aggregation control protocol (LACP) protocol data unit (PDU). In some implementations, when configuring the device to send the traffic intended for the destination CE device via the first PE device and the traffic intended for the EVPN via the second PE device and not the first PE device, the customer edge device may generate a targeted distribution list, where the targeted distribution list indicates that the CE device is to communicate the traffic intended for the destination CE device via the first group of links and that the CE device is to communicate the traffic intended for the EVPN via the second group of links.

In some implementations, the customer edge device may receive, after configuring the CE device to send the traffic intended for the destination CE device via the first PE device and the traffic intended for the EVPN via the second PE device and not the first PE device, third traffic from the destination CE device via the first PE device via the first group of links.

In some implementations, the customer edge device may receive, from the first PE device and after sending the first traffic and the second traffic, an additional message indicating that the first PE device is reconnected with the EVPN. The customer edge device may configure, based on the additional message, the CE device to send the traffic intended for the destination CE device via the first PE device and the traffic intended for the EVPN via the first PE device and the second PE device. In some implementations, the customer edge device may send, based on configuring the CE device to send the traffic intended for the destination CE device via the first PE device and the traffic intended for the EVPN via the first PE device and the second PE device, third traffic to the EVPN via the first group of links and the first PE device and via the second group of links and the second PE device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
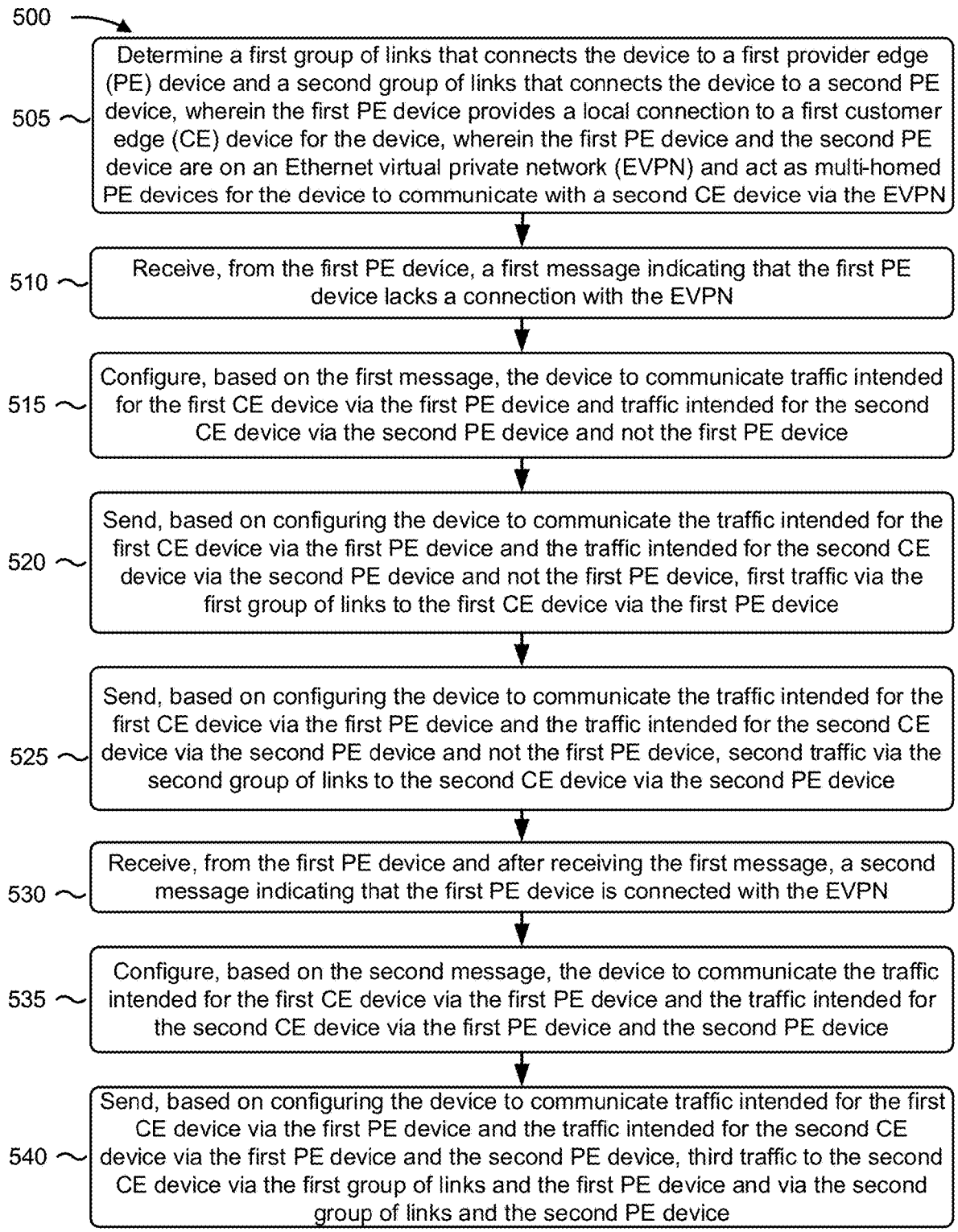
FIG. 5 is a flow chart of an example process for configuring targeted distribution of traffic.

FIG. 5 is a flow chart of an example process 500 for configuring targeted distribution of traffic. In some implementations, one or more process blocks of FIG. 5 may be performed by a customer edge device (e.g., customer edge device 210-1). In some implementations, one or more process blocks of FIG. 5 may be performed by another device or a group of devices separate from or including the customer edge device, such as another customer edge device (e.g., customer edge device 210-2 and/or customer edge device 210-3) and/or a provider edge device (e.g., provider edge device 220).

As shown in FIG. 5, process 500 may include determining a first group of links that connects the customer edge device to a first provider edge (PE) device and a second group of links that connects the customer edge device to a second PE device, wherein the first PE device provides a local connection to a first customer edge (CE) device for the customer edge device, and wherein the first PE device and the second PE device are on an Ethernet virtual private network (EVPN) and act as multi-homed PE devices for the customer edge device to communicate with a second CE device via the EVPN (block 505). For example, the customer edge device (e.g., using input component 305, switching component 310, output component 315, controller 320, and/or the like) may determine a first group of links that connects the customer edge device to a first PE device and a second group of links that connects the customer edge device to a second PE device, as described above in connection with FIGS. 1A-1G. In some implementations, the first PE device may provide a local connection to a first CE device for the customer edge device. In some implementations, the first PE device and the second PE device may be on an EVPN and act as multi-homed PE devices for the customer edge device to communicate with a second CE device via the EVPN.

As further shown in FIG. 5, process 500 may include receiving, from the first PE device, a first message indicating that the first PE device lacks a connection with the EVPN (block 510). For example, the customer edge device (e.g., using input component 305, switching component 310, controller 320, and/or the like) may receive, from the first PE device, a first message indicating that the first PE device lacks a connection with the EVPN, as described above in connection with FIGS. 1A-1G.

As further shown in FIG. 5, process 500 may include configuring, based on the first message, the customer edge device to communicate traffic intended for the first CE device via the first PE device and traffic intended for the second CE device via the second PE device and not the first PE device (block 515). For example, the customer edge device (e.g., using switching component 310, output component 315, controller 320, and/or the like) may configure, based on the first message, the customer edge device to communicate traffic intended for the first CE device via the first PE device and traffic intended for the second CE device via the second PE device and not the first PE device, as described above in connection with FIGS. 1A-1G.

As further shown in FIG. 5, process 500 may include sending, based on configuring the customer edge device to communicate the traffic intended for the first CE device via the first PE device and the traffic intended for the second CE device via the second PE device and not the first PE device, first traffic via the first group of links to the first CE device via the first PE device (block 520). For example, the customer edge device (e.g., using switching component 310, output component 315, controller 320, and/or the like) may send, based on configuring the customer edge device to communicate the traffic intended for the first CE device via the first PE device and the traffic intended for the second CE device via the second PE device and not the first PE device, first traffic via the first group of links to the first CE device via the first PE device, as described above in connection with FIGS. 1A-1G.

As further shown in FIG. 5, process 500 may include sending, based on configuring the customer edge device to communicate the traffic intended for the first CE device via the first PE device and the traffic intended for the second CE device via the second PE device and not the first PE device, second traffic via the second group of links to the second CE device via the second PE device (block 525). For example, the customer edge device (e.g., using switching component 310, output component 315, controller 320, and/or the like) may send, based on configuring the customer edge device to communicate the traffic intended for the first CE device via the first PE device and the traffic intended for the second CE device via the second PE device and not the first PE device, second traffic via the second group of links to the second CE device via the second PE device, as described above in connection with FIGS. 1A-1G.

As further shown in FIG. 5, process 500 may include receiving, from the first PE device and after receiving the first message, a second message indicating that the first PE device is connected with the EVPN (block 530). For example, the customer edge device (e.g., using input component 305, switching component 310, controller 320, and/or the like) may receive, from the first PE device and after receiving the first message, a second message indicating that the first PE device is connected with the EVPN, as described above in connection with FIGS. 1A-1G.

As further shown in FIG. 5, process 500 may include configuring, based on the second message, the customer edge device to communicate the traffic intended for the first CE device via the first PE device and the traffic intended for the second CE device via the first PE device and the second PE device (block 535). For example, the customer edge device (e.g., using switching component 310, output component 315, controller 320, and/or the like) may configure, based on the second message, the customer edge device to communicate the traffic intended for the first CE device via the first PE device and the traffic intended for the second CE device via the first PE device and the second PE device, as described above in connection with FIGS. 1A-1G.

As further shown in FIG. 5, process 500 may include sending, based on configuring the customer edge device to communicate the traffic intended for the first CE device via the first PE device and the traffic intended for the second CE device via the first PE device and the second PE device, third traffic to the second CE device via the first group of links and the first PE device and via the second group of links and the second PE device (block 540). For example, the customer edge device (e.g., using switching component 310, output component 315, controller 320, and/or the like) may send, based on configuring the customer edge device to communicate the traffic intended for the first CE device via the first PE device and the traffic intended for the second CE device via the first PE device and the second PE device, third traffic to the second CE device via the first group of links and the first PE device and via the second group of links and the second PE device, as described above in connection with FIGS. 1A-1G.

Process 500 may include additional implementations, such as any single implementation or any combination of implementations described below and/or in connection with one or more other processes described elsewhere herein.

In some implementations, the first message and the second message may be link aggregation control protocol (LACP) protocol data units (PDUs).

In some implementations, when configuring, based on the first message, the customer edge device to communicate the traffic intended for the first CE device via the first PE device and the traffic intended for the second CE device via the second PE device and not the first PE device, the customer edge device may generate a targeted distribution list that indicates that the customer edge device is to communicate the traffic intended for the first CE device via the first group of links and that the customer edge device is to communicate the traffic intended for the second CE device via the second group of links.

In some implementations, when configuring, based on the second message, the customer edge device to communicate the traffic intended for the first CE device via the first PE device and the traffic intended for the second CE device via the first PE device and the second PE device, the customer edge device may update the targeted distribution list to indicate that the customer edge device is to communicate the traffic intended for the first CE device via the first group of links and that the customer edge device is to communicate the traffic intended for the second CE device via the first group of links and the second group of links.

In some implementations, the customer edge device may receive, after configuring, based on the first message, the customer edge device to communicate the traffic intended for the first CE device via the first PE device and the traffic intended for the second CE device via the second PE device and not the first PE device, fourth traffic from the second CE device via the second PE device via the second group of links.

In some implementations, the customer edge device may receive, after configuring, based on the second message, the customer edge device to communicate the traffic intended for the first CE device via the first PE device and the traffic intended for the second CE device via the first PE device and the second PE device, fourth traffic from the second CE device via the first PE device via the first group of links and via the second PE device via the second group of links.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for configuring targeted distribution of traffic. In some implementations, one or more process blocks of FIG. 6 may be performed by a provider edge device (e.g., provider edge device 220-1). In some implementations, one or more process blocks of FIG. 6 may be performed by another device or a group of devices separate from or including the provider edge device, such as a customer edge device (e.g., customer edge device 210) and/or another provider edge device (e.g., provider edge device 220-2 and/or provider edge device 220-3).

As shown in FIG. 6, process 600 may include determining that a provider edge (PE) device has a first local connection to a first customer edge (CE) device and a second local connection to a second CE device (block 605). For example, the provider edge device (e.g., using input component 305, switching component 310, output component 315, controller 320, and/or the like) may determine that the PE device has a first local connection to a first customer edge (CE) device and a second local connection to a second CE device, as described above in connection with FIGS. 1A-1G.

As further shown in FIG. 6, process 600 may include determining that the PE device is on an Ethernet virtual private network (EVPN) and that the PE device is a multi-homed PE device for the first CE device to communicate with a third CE device via the EVPN (block 610). For example, the provider edge device (e.g., using input component 305, switching component 310, output component 315, controller 320, and/or the like) may determine that the PE device is on an Ethernet virtual private network (EVPN) and that the PE device is a multi-homed PE device for the first CE device to communicate with a third CE device via the EVPN, as described above in connection with FIGS. 1A-1G.

As further shown in FIG. 6, process 600 may include determining that the PE device lost a connection with the EVPN (block 615). For example, the provider edge device (e.g., using input component 305, switching component 310, output component 315, controller 320, and/or the like) may determine that the PE device lost a connection with the EVPN, as described above in connection with FIGS. 1A-1G.

As further shown in FIG. 6, process 600 may include sending, after determining that the PE device is not connected with the EVPN, a first message to the first CE device indicating that the PE device lacks a connection with the EVPN, thereby causing the first CE device to communicate traffic intended for the second CE device via the PE device and to communicate traffic intended for the third CE device via an additional PE device connected with the EVPN and not via the PE device (block 620). For example, the provider edge device (e.g., using switching component 310, output component 315, controller 320, and/or the like) may send, after determining that the PE device is not connected with the EVPN, a first message to the first CE device indicating that the PE device lacks a connection with the EVPN, thereby causing the first CE device to communicate traffic intended for the second CE device via the PE device and to communicate traffic intended for the third CE device via an additional PE device connected with the EVPN and not via the PE device, as described above in connection with FIGS. 1A-1G.

Process 600 may include additional implementations, such as any single implementation or any combination of implementations described below and/or in connection with one or more other processes described elsewhere herein.

In some implementations, the provider edge device may receive, from the second CE device and after sending the first message, traffic intended for the first CE device, and may send, after receiving the traffic, the traffic to the first CE device. In some implementations, the provider edge device, when determining that the PE device lost a connection with the EVPN, may determine that the PE device has not received traffic via the EVPN for a threshold period of time.

In some implementations, the provider edge device may determine, after sending the first message, that the PE device is reconnected with the EVPN, and may send, after determining that the PE device is reconnected with the EVPN, a second message to the first CE device indicating that the PE device is connected with the EVPN to cause the first CE device to be configured to communicate the traffic intended for the second CE device via the PE device and the traffic intended for the third CE device via the PE device and the additional PE device. In some implementations, the provider edge device, when determining that the PE device is reconnected with the EVPN comprises, may determine that the PE device has received traffic via the EVPN after a period of not receiving traffic via the EVPN.

In some implementations, the provider edge device may receive, from the first CE device and after sending the second message, first traffic intended for the second CE device; may send, after receiving the first traffic, the first traffic to the second CE device; may receive, from the first CE device and after sending the second message, second traffic intended for the third CE device; and may send, after receiving the second traffic, the second traffic to the third CE device via the EVPN.

In some implementations, the provider edge device, when sending the first message to the first CE device, may select a particular link of a plurality of links that connect the PE device to the first CE device and send the first message to the first CE device via the particular link. In some implementations, the provider edge device, when sending the second message to the first CE device comprises, may select the particular link, and send the second message to the first CE device via the particular link.

In some implementations, the provider edge device may receive, from the third CE device via the EVPN and after sending the second message, data intended for the second CE device, and may send, after receiving the data, the data to the second CE device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A customer edge (CE) device, comprising:
one or more memories; and
one or more processors to:
  determine a link aggregation group (LAG) that aggregates a plurality of links that connect the CE device to a first provider edge (PE) device and a second PE device,
    wherein the plurality of links includes a first group of links that connects the CE device to the first PE device and a second group of links that connects the CE device to the second PE device,
    wherein the first PE device and the second PE device are on an Ethernet virtual private network (EVPN) and are multi-homed PE devices for the CE device,
      wherein the first PE device provides a local connection to a destination CE device for the CE device, and
      wherein the CE device is to communicate with the destination CE device only via the first PE device;
  receive, from the first PE device, a message indicating that the first PE device lacks a connection with the EVPN;
  configure, based on the message, the CE device to send traffic intended for the destination CE device via the first PE device and traffic intended for the EVPN via the second PE device and not the first PE device;
  send, based on configuring the CE device to send the traffic intended for the CE device via the first PE device and the traffic intended for the EVPN via the second PE device and not the first PE device, first traffic via the first group of links to the destination CE device via the first PE device; and
  send, based on configuring the CE device to send the traffic intended for the destination CE device via the first PE device and the traffic intended for the EVPN via the second PE device and not the first PE device, second traffic via the second group of links to the EVPN via the second PE device.

2. The CE device of claim 1, wherein the EVPN is configured in all-active mode.

3. The CE device of claim 1, wherein the message is a link aggregation control protocol (LACP) protocol data unit (PDU).

4. The CE device of claim 1, wherein the one or more processors, when configuring the CE device to send the traffic intended for the destination CE device via the first PE device and the traffic intended for the EVPN via the second PE device and not the first PE device, are to:
  generate a targeted distribution list that indicates that the CE device is to communicate the traffic intended for the destination CE device via the first group of links and that the CE device is to communicate the traffic intended for the EVPN via the second group of links.

5. The CE device of claim 1, wherein the one or more processors are further to:
  receive, after configuring the CE device to send the traffic intended for the destination CE device via the first PE device and the traffic intended for the EVPN via the second PE device and not the first PE device, third traffic from the destination CE device via the first PE device via the first group of links.

6. The CE device of claim 1, wherein the one or more processors are further to:
  receive, from the first PE device and after sending the first traffic and the second traffic, an additional message indicating that the first PE device is reconnected with the EVPN; and
  configure, based on the additional message, the CE device to send the traffic intended for the destination CE device via the first PE device and the traffic intended for the EVPN via the first PE device and the second PE device.

7. The CE device of claim 6, wherein the one or more processors are further to:
  send, based on configuring the CE device to send the traffic intended for the destination CE device via the first PE device and the traffic intended for the EVPN via the first PE device and the second PE device, third traffic to the EVPN via the first group of links and the first PE device and via the second group of links and the second PE device.

8. A non-transitory computer-readable medium storing instructions, the instructions comprising:
one or more instructions that, when executed by one or more processors of a customer edge (CE) device, cause the one or more processors to:
  determine a first group of links that connects the CE device to a first provider edge (PE) device and a second group of links that connects the CE device to a second PE device,
    wherein the first PE device provides a local connection to a first CE device for the CE device,
    wherein the first PE device and the second PE device are on an Ethernet virtual private network (EVPN) and act as multi-homed PE devices for the CE device to communicate with a second CE device via the EVPN, and
    wherein the CE device is to communicate with the first CE device only via the first PE device;
  receive, from the first PE device, a first message indicating that the first PE device lacks a connection with the EVPN;
  configure, based on the first message, the CE device to communicate traffic intended for the first CE device via the first PE device and traffic intended for the second CE device via the second PE device and not the first PE device;

send, based on configuring the CE device to communicate the traffic intended for the first CE device via the first PE device and the traffic intended for the second CE device via the second PE device and not the first PE device, first traffic via the first group of links to the first CE device via the first PE device;

send, based on configuring the CE device to communicate the traffic intended for the first CE device via the first PE device and the traffic intended for the second CE device via the second PE device and not the first PE device, second traffic via the second group of links to the second CE device via the second PE device;

receive, from the first PE device and after receiving the first message, a second message indicating that the first PE device is connected with the EVPN;

configure, based on the second message, the CE device to communicate the traffic intended for the first CE device via the first PE device and the traffic intended for the second CE device via the first PE device and the second PE device; and send, based on configuring the CE device to communicate the traffic intended for the first CE device via the first PE device and the traffic intended for the second CE device via the first PE device and the second PE device, third traffic to the second CE device via the first group of links and the first PE device and via the second group of links and the second PE device.

9. The non-transitory computer-readable medium of claim 8, wherein the first message and the second message are link aggregation control protocol (LACP) protocol data units (PDUs).

10. The non-transitory computer-readable medium of claim 8, wherein the one or more instructions, that cause the one or more processors to configure, based on the first message, the CE device to communicate the traffic intended for the first CE device via the first PE device and the traffic intended for the second CE device via the second PE device and not the first PE device, cause the one or more processors to:

generate a targeted distribution list that indicates that the CE device is to communicate the traffic intended for the first CE device via the first group of links and that the CE device is to communicate the traffic intended for the second CE device via the second group of links.

11. The non-transitory computer-readable medium of claim 10, wherein the one or more instructions, that cause the one or more processors to configure, based on the second message, the CE device to communicate the traffic intended for the first CE device via the first PE device and the traffic intended for the second CE device via the first PE device and the second PE device, cause the one or more processors to:

update the targeted distribution list to indicate that the CE device is to communicate the traffic intended for the first CE device via the first group of links and that the CE device is to communicate the traffic intended for the second CE device via the first group of links and the second group of links.

12. The non-transitory computer-readable medium of claim 8, wherein the one or more instructions, when executed by the one or more processors, further cause the one or more processors to:

receive, after configuring the CE device to communicate the traffic intended for the first CE device via the first PE device and the traffic intended for the second CE device via the second PE device and not the first PE device, fourth traffic from the second CE device via the second PE device via the second group of links.

13. The non-transitory computer-readable medium of claim 8, wherein the one or more instructions, when executed by the one or more processors, further cause the one or more processors to:

receive, after configuring, based on the second message, the CE device to communicate the traffic intended for the first CE device via the first PE device and the traffic intended for the second CE device via the first PE device and the second PE device, fourth traffic from the second CE device via the first PE device via the first group of links and via the second PE device via the second group of links.

14. A method, comprising:

determining, by a provider edge (PE) device, that the PE device has a first local connection to a first customer edge (CE) device and a second local connection to a second CE device,
wherein the first CE device is to communicate with the second CE device only via the PE device;

determining, by the PE device, that the PE device is on an Ethernet virtual private network (EVPN) and that the PE device is a multi-homed PE device for the first CE device to communicate with a third CE device via the EVPN;

determining, by the PE device, that the PE device lost a connection with the EVPN; and sending, by the PE device and after determining that the PE device is not connected with the EVPN, a first message to the first CE device indicating that the PE device lacks a connection with the EVPN, thereby causing the first CE device to communicate traffic intended for the second CE device via the PE device and to communicate traffic intended for the third CE device via an additional PE device connected with the EVPN and not via the PE device.

15. The method of claim 14, further comprising:

receiving, from the second CE device and after sending the first message, traffic intended for the first CE device; and sending, after receiving the traffic intended for the first CE device, the traffic to the first CE device.

16. The method of claim 14, wherein determining that the PE device lost the connection with the EVPN comprises:

determining that the PE device has not received traffic via the EVPN for a threshold period of time.

17. The method of claim 14, further comprising:

determining, by the PE device and after sending the first message, that the PE device is reconnected with the EVPN; and sending, by the PE device and after determining that the PE device is reconnected with the EVPN, a second message to the first CE device indicating that the PE device is connected with the EVPN to cause the first CE device to be configured to communicate the traffic intended for the second CE device via the PE device and the traffic intended for the third CE device via the PE device and the additional PE device.

18. The method of claim 17, further comprising:

receiving, from the first CE device and after sending the second message, first traffic intended for the second CE device;

sending, after receiving the first traffic, the first traffic to the second CE device;

receiving, from the first CE device and after sending the second message, second traffic intended for the third CE device; and sending, after receiving the second traffic, the second traffic to the third CE device via the EVPN.

19. The method of claim 17, wherein determining that the PE device is reconnected with the EVPN comprises:

determining that the PE device has received traffic via the EVPN after a period of not receiving traffic via the EVPN.

20. The method of claim 17, wherein sending the first message to the first CE device comprises:

selecting a particular link of a plurality of links that connect the PE device to the first CE device; and sending the first message to the first CE device via the particular link, wherein sending the second message to the first CE device comprises selecting the particular link, and sending the second message to the first CE device via the particular link.

\* \* \* \* \*